(12) United States Patent
Shiigi et al.

(10) Patent No.: US 11,192,029 B2
(45) Date of Patent: Dec. 7, 2021

(54) INFORMATION PROCESSING DEVICE, INFORMATION PROCESSING METHOD, AND COMPUTER PROGRAM

(71) Applicant: SONY CORPORATION, Tokyo (JP)

(72) Inventors: Daisuke Shiigi, Kanagawa (JP); Akira Honjo, Tokyo (JP); Kayoko Nagatani, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/622,543

(22) PCT Filed: May 7, 2018

(86) PCT No.: PCT/JP2018/017673
§ 371 (c)(1),
(2) Date: Dec. 13, 2019

(87) PCT Pub. No.: WO2018/235435
PCT Pub. Date: Dec. 27, 2018

(65) Prior Publication Data
US 2020/0206633 A1    Jul. 2, 2020

(30) Foreign Application Priority Data
Jun. 22, 2017  (JP) .............................. JP2017-121877

(51) Int. Cl.
*A63F 13/69*     (2014.01)
*A63F 13/327*    (2014.01)
(Continued)

(52) U.S. Cl.
CPC ............ *A63F 13/69* (2014.09); *A63F 13/327* (2014.09); *A63F 13/34* (2014.09); *A63F 13/73* (2014.09);
(Continued)

(58) Field of Classification Search
None
See application file for complete search history.

(56) References Cited

U.S. PATENT DOCUMENTS 7,314,407 B1 *   1/2008  Pearson ................. A63F 13/12
                                                     463/7
10,286,328 B2 *  5/2019  Adamenko ............ A63H 17/00
(Continued)

FOREIGN PATENT DOCUMENTS

JP    2006-288966 A    10/2006
JP    2015-058147 A    3/2015
(Continued)

*Primary Examiner* — Kevin Y Kim
(74) *Attorney, Agent, or Firm* — Paratus Law Group, PLLC

(57) ABSTRACT

There is provided an image processing apparatus including circuitry configured to acquire first authentication data from a first object and second authentication data from a second object, determine authenticity of the first object based on the first authentication data, determine authenticity of the second object based on the second authentication data, and change activation states of both the first object and the second object based on the determined authenticities of both the first object and the second object. When the determined authenticities of both the first object and the second object are determined to be authentic, the circuitry is further configured to change the activation states of both the first object and the second object.

16 Claims, 15 Drawing Sheets

(51) Int. Cl.
*A63F 13/34* (2014.01)
*A63F 13/73* (2014.01)
*A63F 13/2145* (2014.01)
*A63F 13/792* (2014.01)

(52) U.S. Cl.
CPC ......... *A63F 13/2145* (2014.09); *A63F 13/792* (2014.09); *A63F 2300/1075* (2013.01); *A63F 2300/406* (2013.01); *A63F 2300/532* (2013.01); *A63F 2300/5546* (2013.01); *A63F 2300/609* (2013.01)

(56) References Cited

U.S. PATENT DOCUMENTS

2005/0288103 A1\* 12/2005 Konuma ............. G07F 17/3239
463/42
2016/0358239 A1\* 12/2016 Inagaki ................... A63F 13/65

FOREIGN PATENT DOCUMENTS

| JP | 2016-163671 A | 9/2016 |
| JP | 2016-220875 A | 12/2016 |
| JP | 2017-000527 A | 1/2017 |
| JP | 2017-029424 A | 2/2017 |
| JP | 2017-029427 A | 2/2017 |
| JP | 2017-064041 A | 4/2017 |

\* cited by examiner

[FIG. 1]
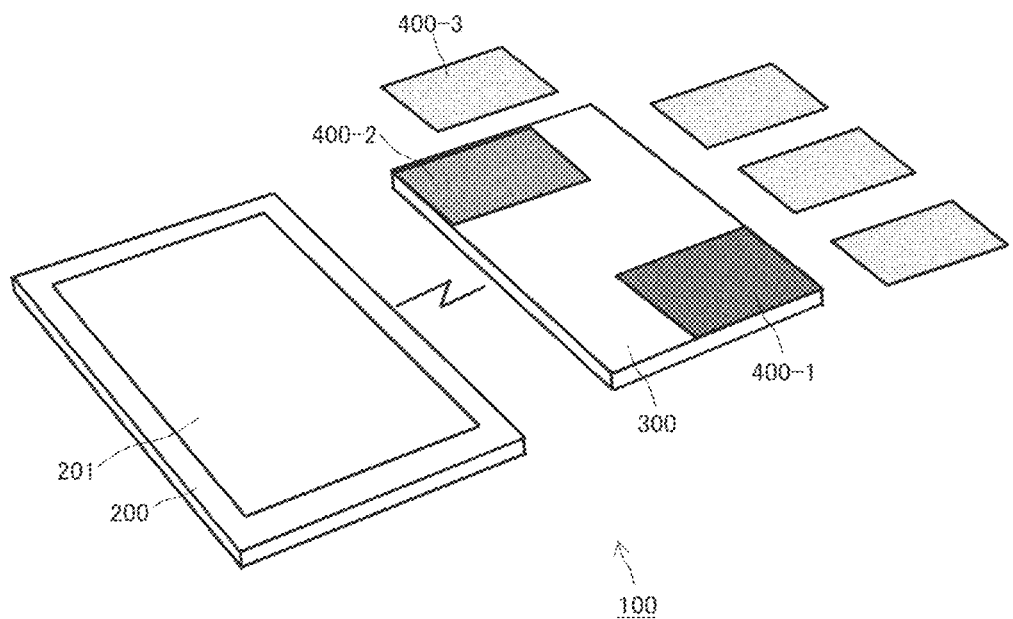
[FIG. 2]
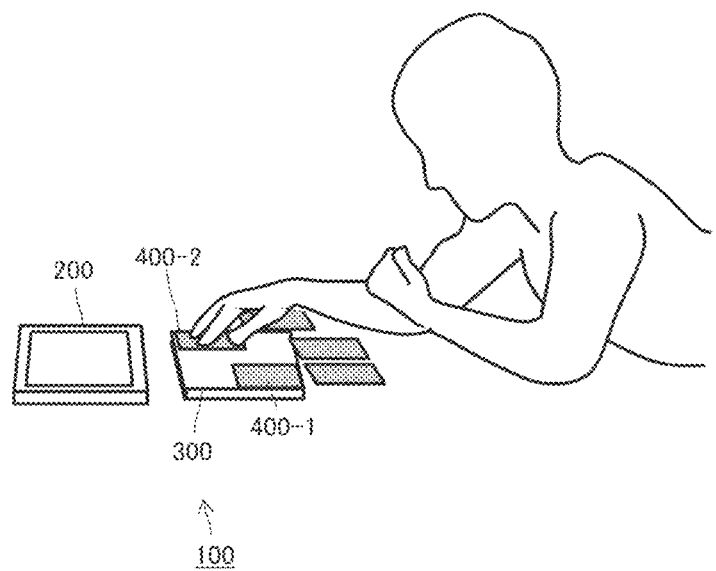

[FIG. 3]
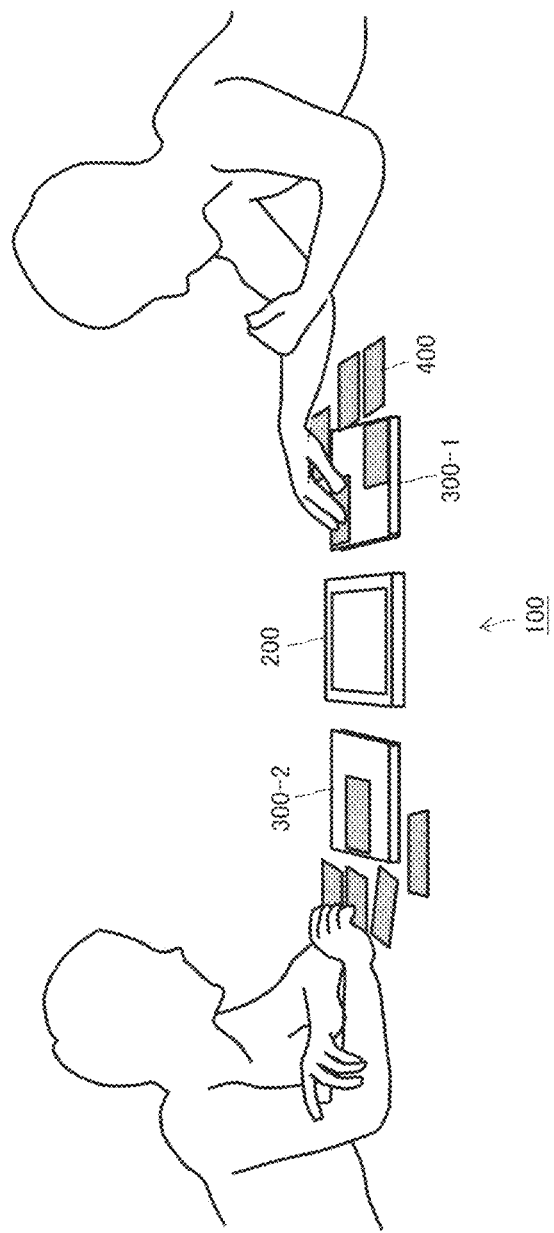

[FIG. 4]
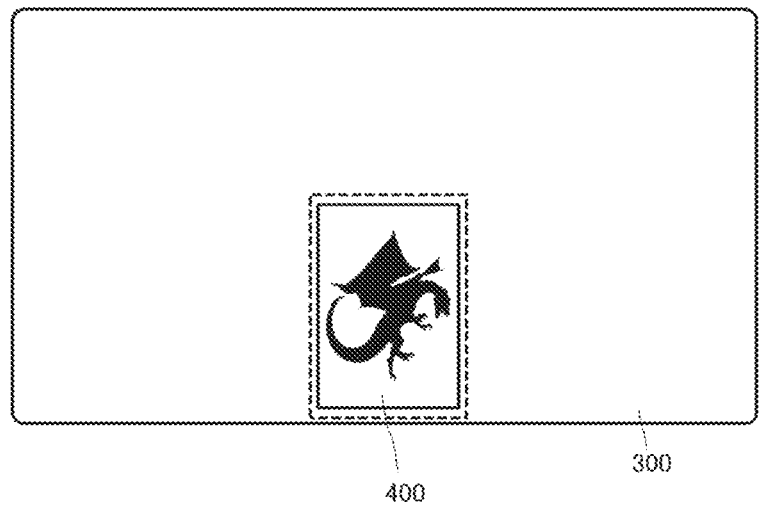
[FIG. 5]
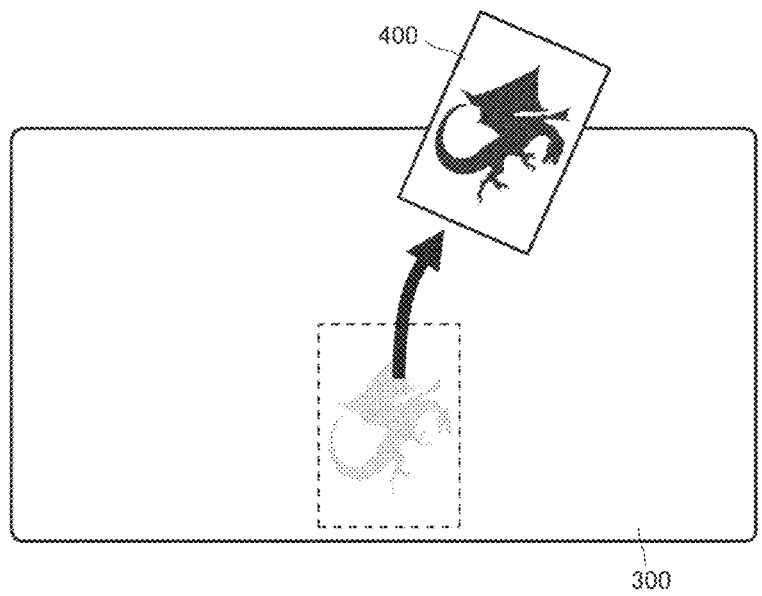

[FIG. 6]
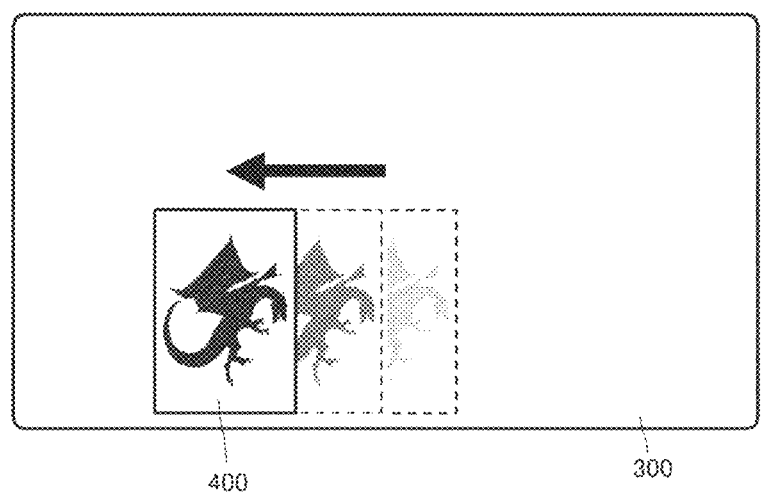
[FIG. 7]
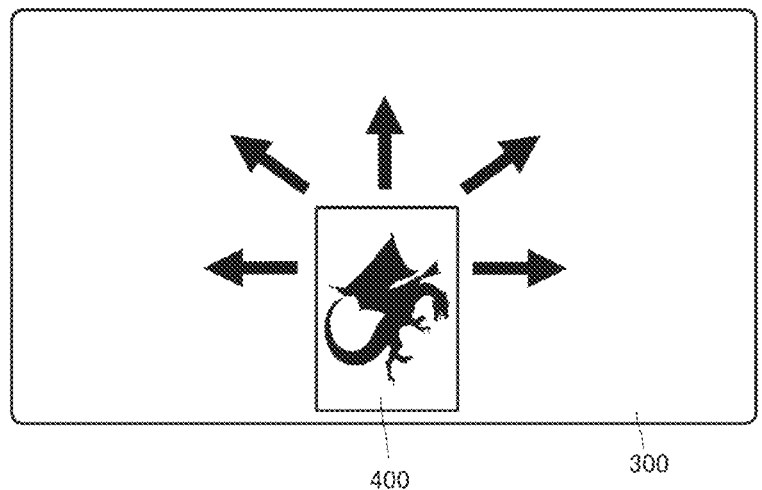

[FIG. 8]
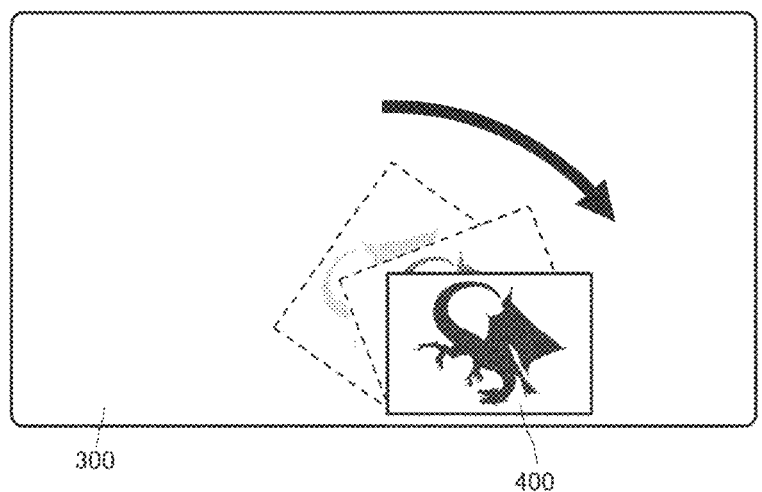

[FIG. 9]
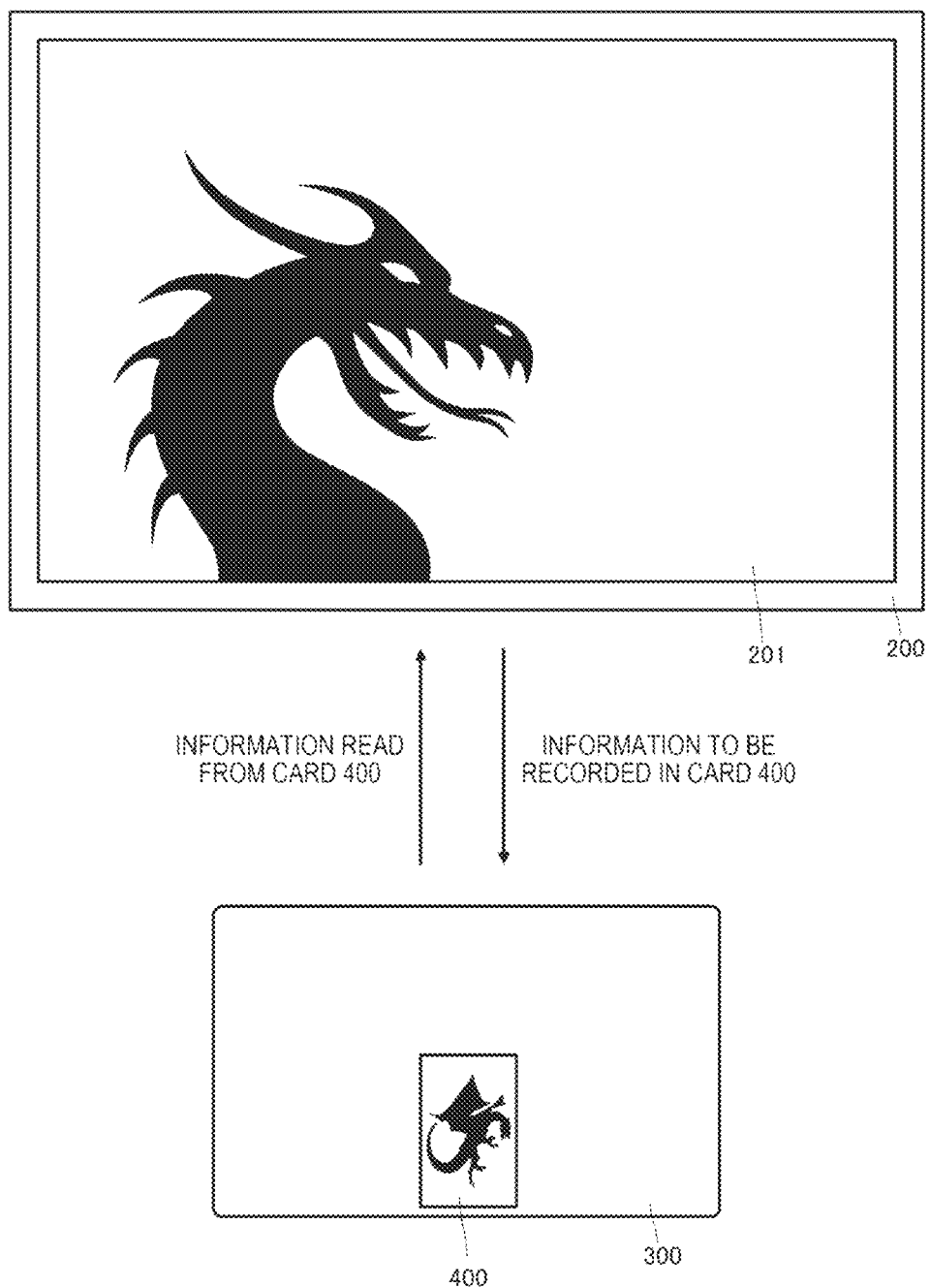

[FIG. 10]
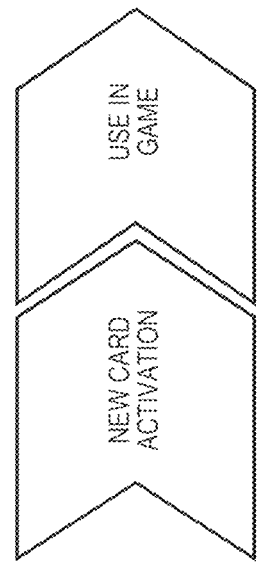
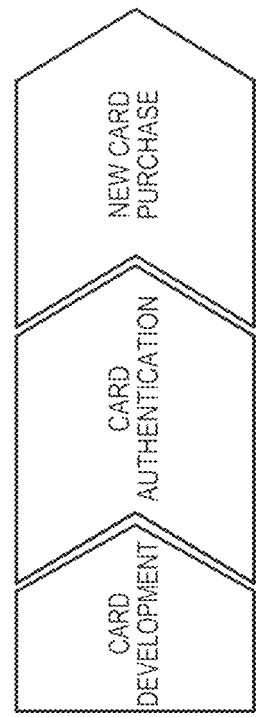

[FIG. 11]
[FIG. 12]
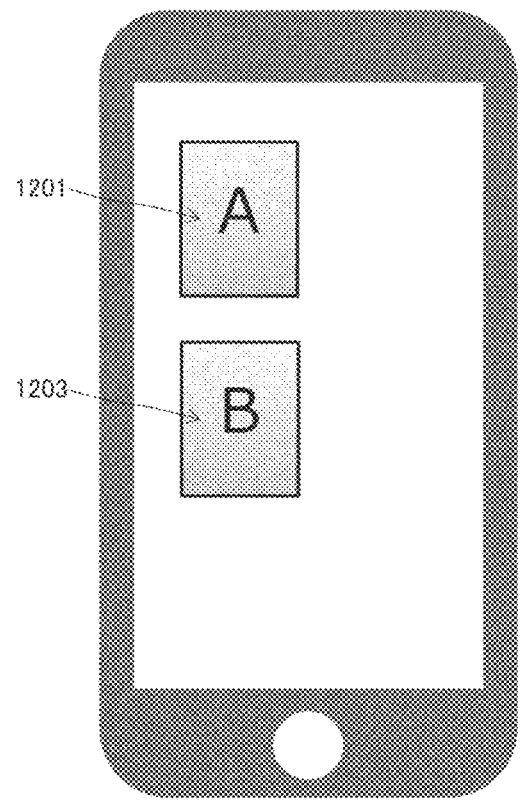

[FIG. 13]
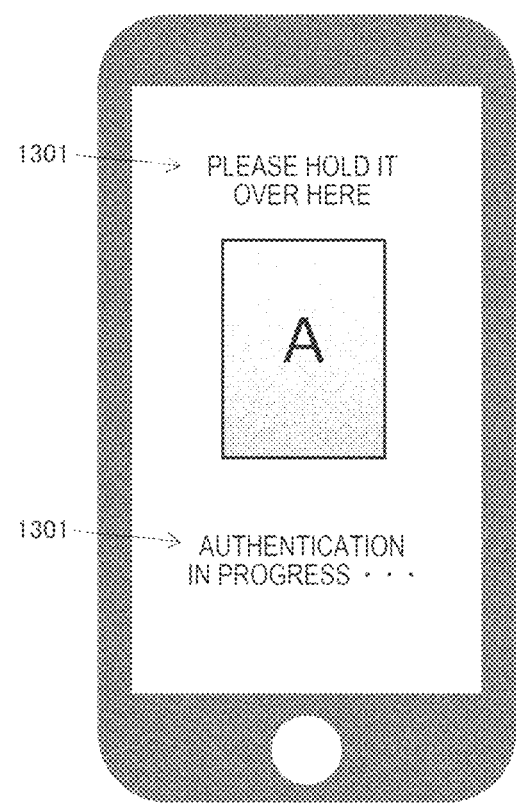

[FIG. 14]
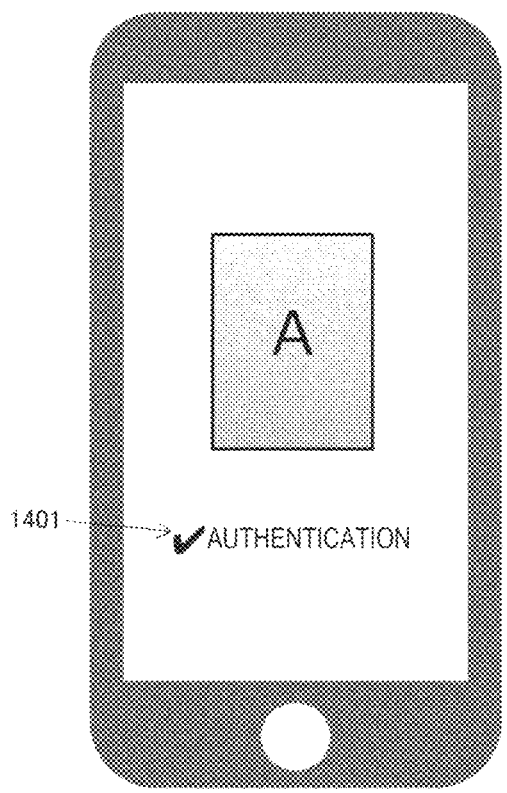
[FIG. 15]
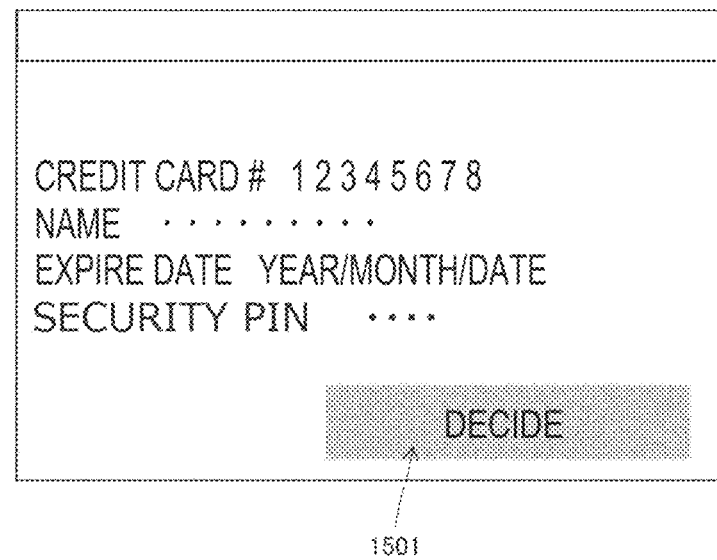

[FIG. 16]
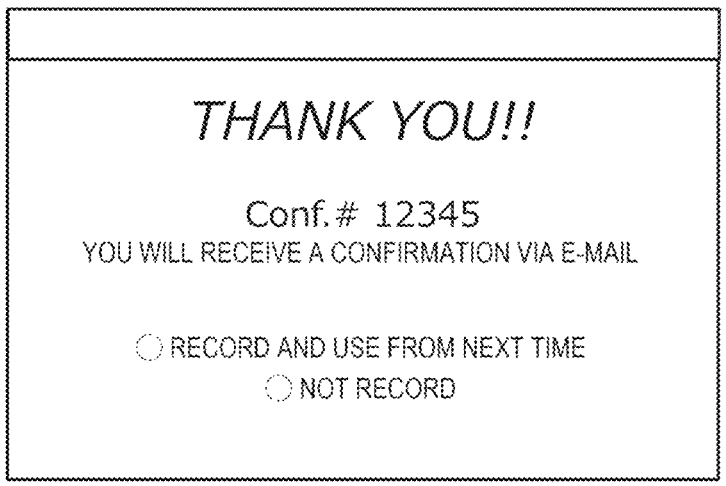

[FIG. 17]
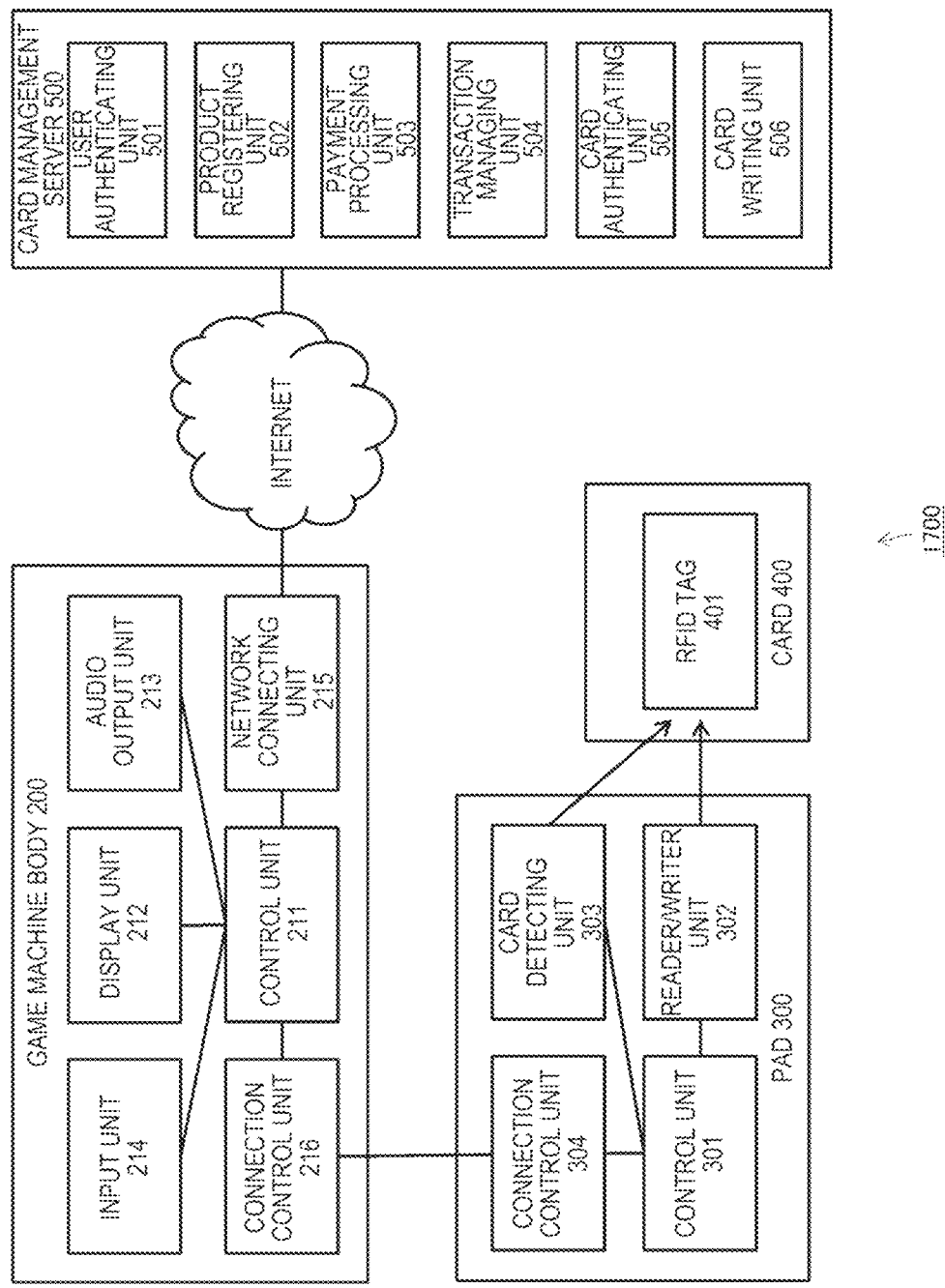

[FIG. 18]
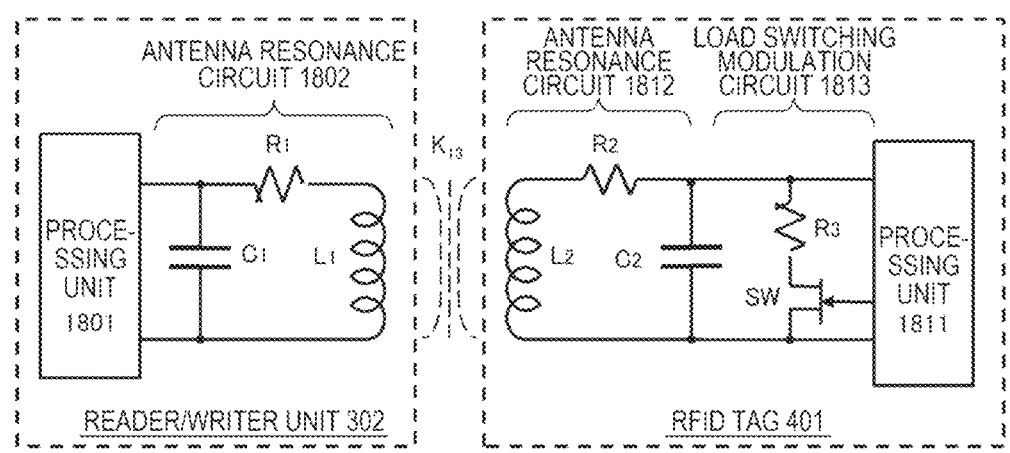
[FIG. 19]
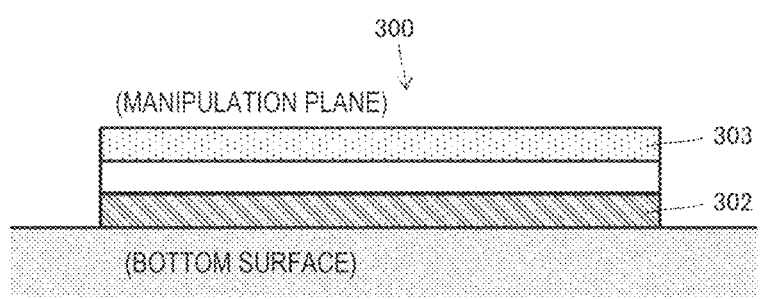

[FIG. 20]
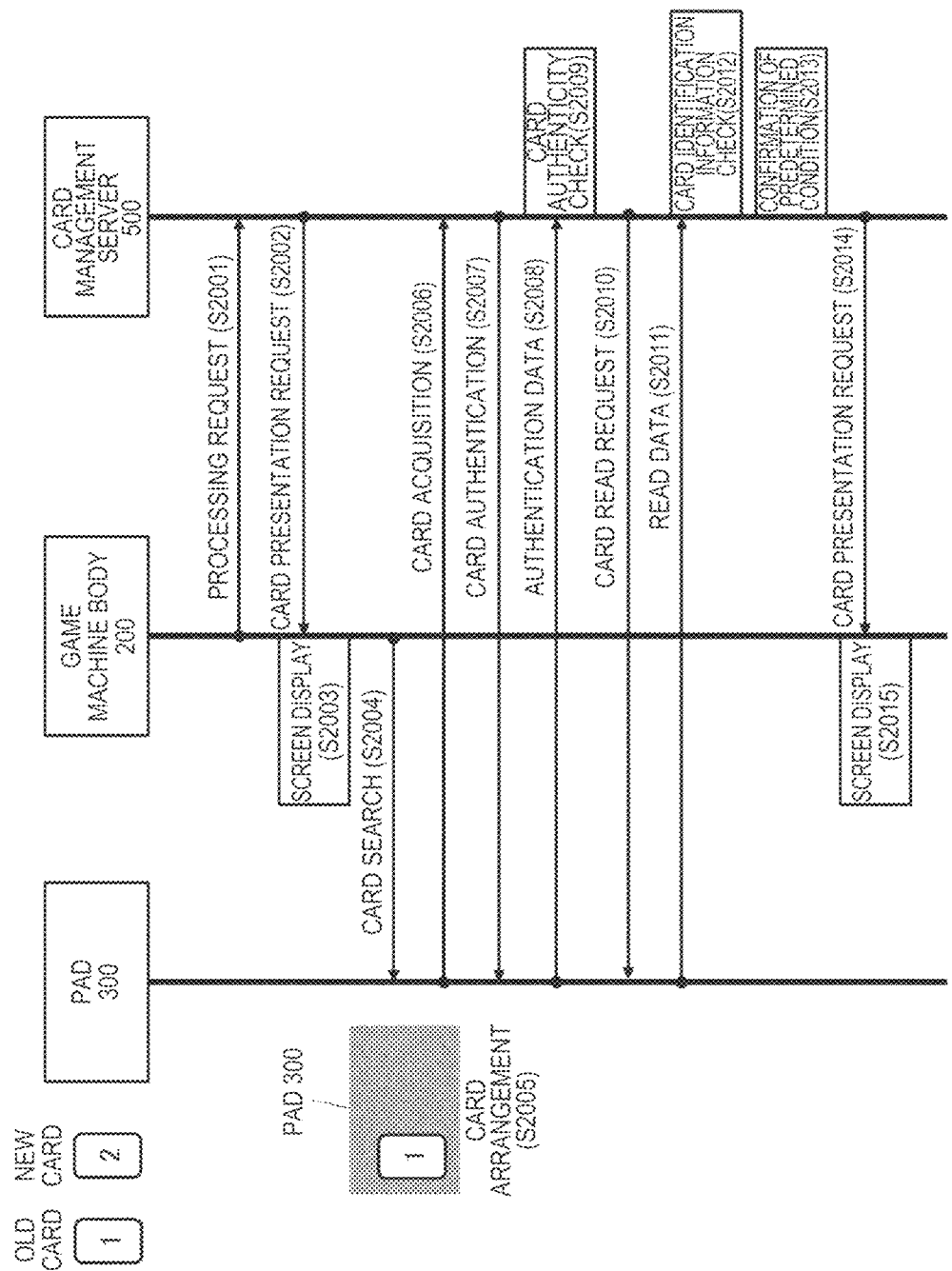

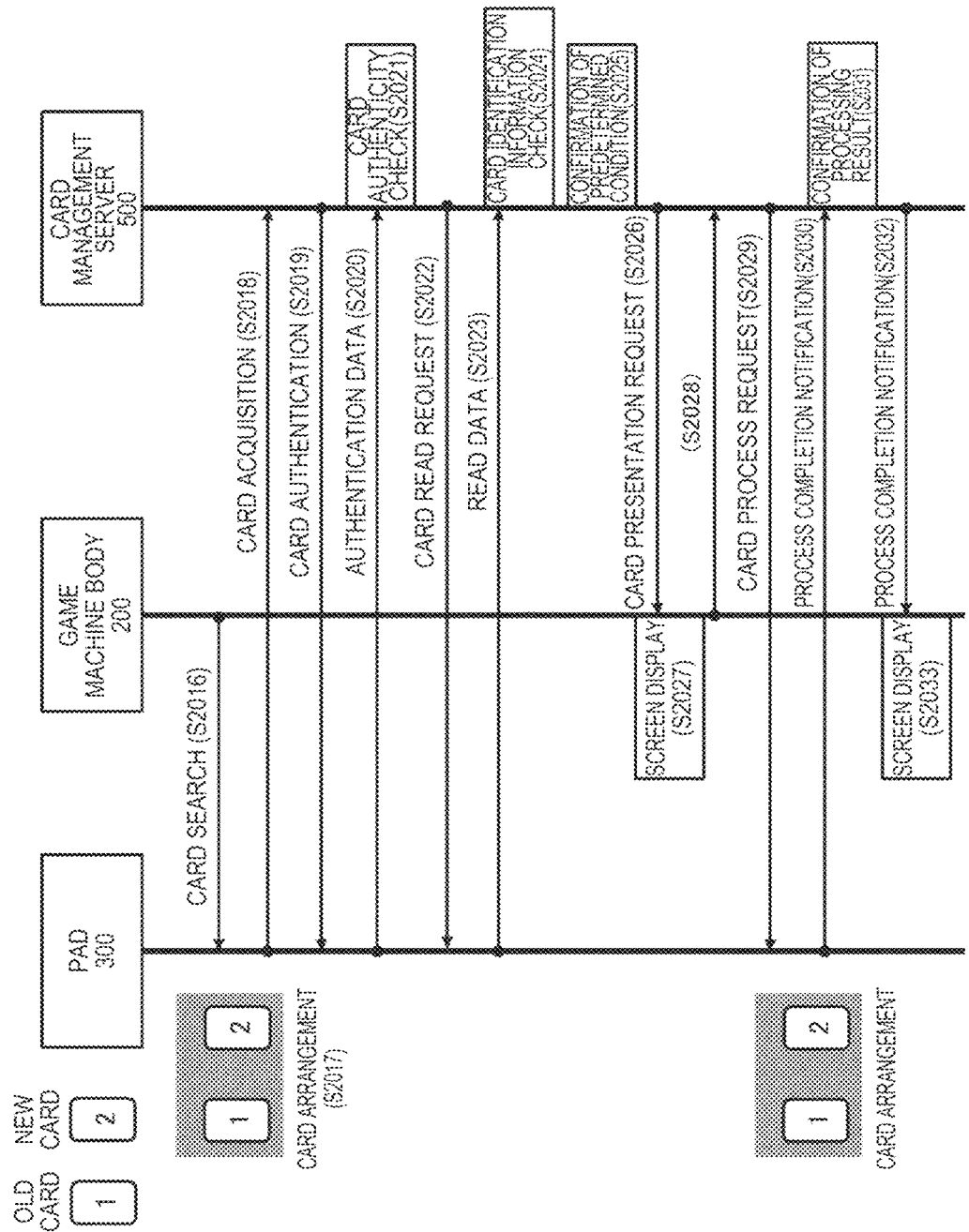
[FIG. 21]

INFORMATION PROCESSING DEVICE, INFORMATION PROCESSING METHOD, AND COMPUTER PROGRAM

CROSS REFERENCE TO RELATED APPLICATIONS

This application is a National Stage Patent Application of PCT International Patent Application No. PCT/JP2018/017673 filed May 7, 2018 under 35 U.S.C. § 371, which claims the benefit of Japanese Priority Patent Application JP 2017-121877 filed Jun. 22, 2017, the entire contents of which are incorporated herein by reference.

TECHNICAL FIELD

The technology disclosed in this specification relates to an information processing device, an information processing method, and a computer program using proximity wireless communication.

BACKGROUND ART

In the past, games using sing playing tools, that is, objects such as a spinning top, a mess kit, a cup and ball, a marble, or a spinning top (beigoma) has widely spread. In recent years in a case in which information technology has developed, opportunities to play with objects are reduced, and instead, opportunities to enjoy games using an information terminal such as a smartphone or a tablet are increasing regardless of age and sex.

On the other hand, attempts (projects) to combine a digital game executed on the information terminal with a game using an object have also been made. Specifically, originally virtual digital information such as a character, a weapon, or spoils used in digitalized games is dealt as a real object such as a card or a figure.

For example, a radio frequency Identifier (RFID) tag is installed or embedded in an object such as a card or a figure, and a tag reader/writer is externally connected to an information terminal (or a game machine body) such as a smartphone or a tablet in a wirelessly or wired manner. A user who is a player of a game causes the card or the figure to be placed on the reader/writer appropriately during the game. Then, the information terminal reads information from the RFID tag in the card or the figure through the reader/writer in accordance with the progress of the game being executed (the growth or evolution of a character, exhaustion of a weapon, acquisition of spoils or the like) or rewrite information in the RFID tag (for example, see Patent Literature 1).

CITATION LIST

Patent Literature

[PTL 1]
JP 2016-177814A
[PTL 2]
JP 2016-66153A
[PTL 3]
JP 2008-12207A

SUMMARY

Technical Problem

According to the technology disclosed in this specification, it is desirable to provide an information processing device, an information processing method, and a computer program using proximity wireless communication.

Solution to Problem

According to an aspect of the present disclosure, there is provided an information processing apparatus including: circuitry configured to: acquire first authentication data from a first object and second authentication data from a second object; determine authenticity of the first object based on the first authentication data; determine authenticity of the second object based on the second authentication data; and change activation states of both the first object and the second object based on the determined authenticities of both the first object and the second object, wherein, when the determined authenticities of both the first object and the second object are determined to be authentic, the circuitry is further configured to change the activation states of both the first object and the second object.

According to another aspect of the present disclosure, there is provided an information processing method including: acquiring first authentication data from a first object and second authentication data from a second object; determining authenticity of the first object based on the first authentication data; determining authenticity of the second object based on the second authentication data; changing activation states of both the first object and the second object based on the determined authenticities of both the first object and the second object; and changing, when the determined authenticities of both the first object and the second object are determined to be authentic, the activation states of both the first object and the second object.

According to another aspect of the present disclosure, there is provided an information processing system including: a communication device configured to read information from a first object and a second object and record information to the first object and the second object; a game machine body configured to receive the information read from the first object and the second object and transmit the recorded information to the first object and the second object; and an information processing apparatus including: circuitry configured to: acquire first authentication data from the first object and second authentication data from the second object; determine authenticity of the first object based on the first authentication data; determine authenticity of the second object based on the second authentication data; and change activation states of both the first object and the second object based on the determined authenticities of both the first object and the second object, wherein, when the determined authenticities of both the first object and the second object are determined to be authentic, the circuitry is further configured to change the activation states of both the first object and the second object.

Advantageous Effects of Invention

According to the technique disclosed in this specification, it is possible to provide an information processing device, an information processing method, and a computer program using proximity wireless communication.

Further, the effects described in this specification are merely an example, and the effect of the present technology is not limited thereto. Further, the present technology may have an additional effect in addition to the above effects.

Still other purposes, features, and advantages of the technology disclosed in this specification will become apparent from detailed description based on embodiments described below or the appended drawings.

BRIEF DESCRIPTION OF DRAWINGS

FIG. 1 is a diagram illustrating an external configuration of a game system 100 capable of implementing an application such as a game using proximity wireless communication technology.

FIG. 2 is a diagram illustrating an example in which a single user is playing a game using the game system 100.

FIG. 3 is a diagram illustrating an example in which two users are playing a game using the game system 100.

FIG. 4 is a diagram illustrating a manipulation example for a card 400 on a pad 300 (of causing the card 400 to be placed on the pad 300).

FIG. 5 is a diagram illustrating a manipulation example for a card 400 on a pad 300 (of removing the card 400 from the pad 300).

FIG. 6 is a diagram illustrating a manipulation example for a card 400 on a pad 300 (of changing a position of the card 400 on the pad 300).

FIG. 7 is a diagram illustrating a manipulation example for a card 400 on a pad 300 (of moving the card 400 on the pad 300 back and forth or right and left).

FIG. 8 is a diagram illustrating a manipulation example for a card 400 on a pad 300 (of turning the card 400 on the pad 300 sideways).

FIG. 9 is a diagram illustrating an interaction corresponding to the card 400 on a game machine body 200 side.

FIG. 10 is a diagram illustrating a procedure related to purchase and use of a card.

FIG. 11 is a diagram illustrating a configuration example of a screen for notifying of upgrade to a new card.

FIG. 12 is a diagram illustrating a configuration example of an upgradeable card list screen.

FIG. 13 is a diagram illustrating a configuration example of an old card authentication process screen.

FIG. 14 is a diagram illustrating a configuration example of a screen indicating that an old card authentication process is successfully performed.

FIG. 15 is a diagram illustrating a configuration example of a screen in which a payment method and necessary items are input.

FIG. 16 is a diagram illustrating a screen configuration example of a card purchase order completion e-mail.

FIG. 17 is a diagram illustrating a functional configuration of a communication system 1700.

FIG. 18 is a diagram illustrating a functional configuration for performing proximity wireless communication between a reader/writer unit 302 in a pad 300 and an RFID tag 401 in a card 400.

FIG. 19 is a diagram schematically illustrating a cross-sectional structure of a pad 300.

FIG. 20 is a diagram illustrating a communication sequence example (a first half) performed by a communication system 1700 in a case in which a player starts using a new card.

FIG. 21 is a diagram illustrating a communication sequence example (a second half) performed by a communication system 1700 in a case in which a player starts using a new card.

DESCRIPTION OF EMBODIMENTS

Hereinafter, embodiments of the technology disclosed in this specification will be described in detail with reference to the appended drawings.

A. Game Combined with Object

Attempts to combine a digital game executed on an information terminal with a game using an object by dealing originally virtual digital information such as a character, a weapon, or spoils used in digitalized games as a real object such as a card or a figure have also been made.

For example, a (RFID tag is installed or embedded in a real object such as a card or a figure, and a reader/writer is externally connected to an information terminal (or a game machine body) such as a smartphone or a tablet in a wirelessly or wired manner. A user who is a player of a game causes the card or the figure to be placed on the reader/writer appropriately during the game. Then, the information terminal reads information from the RFID tag in the card or the figure through the reader/writer in accordance with the progress of the game being executed (information such as a score, a game level, acquired spoils, exhaustion of a weapon, or the growth or evolution of a corresponding character on a game) or rewrite information (a level or an experience value of the user or the character in the game (including information such as exhaustion of a weapon or acquisition of spoils) or the like) in the RFID tag.

The following description will proceed with an example of a game using a card mainly for the sake of convenience. A design indicating a character, a weapon, spoils, or the like is assumed to be drawn on a surface of a card through card face printing. Further, design may be drawn on both sides, assuming an application that turns a single card inside out and uses it. Further, it is assumed that the card is made of paper, but it will be appreciated that the card may be a card made of resin or a laminated card.

B. System Configuration

FIG. 1 illustrates an external configuration of a game system 100 capable of implementing an application such as a game using proximity wireless communication technology. Further, FIG. 2 illustrates an example in which a single user is playing a game using the game system 100.

The illustrated game system 100 includes a game machine body 200 and a pad 300. The game machine body 200 includes a general-purpose information terminal such as, for example, a smartphone, a tablet, or the like, and executes games and applications. A top surface of the game machine body 200 includes a screen 201 which displays a game video. The screen 201 may be a touch panel type display, and the user who is the game player can perform an input manipulation on the screen 201 with a fingertip directly.

On the other hand, the pad 300 is a plate-like device on which the user who is the game player to perform, for example, a manipulation of placing cards 400-1, 400-2, and the like corresponding to a character, a weapon, and the spoils. As will be described later, an antenna coil for communicating with the RFID tags embedded in the cards 400-1, 400-2, and the like are arranged in the pad 300 in a two-dimensional array form.

The pad 300 can also be regarded as an external device of the information terminal. The game machine body 200 and the pad 300 are connected with each other via wireless communication such as Bluetooth (a registered trademark). Of course, the game machine body 200 may be connected with the pad 300 in a wired manner using a cable such as a universal serial bus (USB).

Further, the game machine body 200 is assumed to be connected to a wide area network such as the Internet via wireless fidelity (Wi-Fi) or an Ethernet (a registered trademark) cable. For example, the game machine body 200 accesses a web site run by a game publisher, a manufacturer/ distributor of the game machine body 200, or the like and can use various services including a purchase order for the card 400 (described later).

FIG. 3 illustrates a modified example of the game system 100. In the example illustrated in FIG. 2, a single user enjoys a game executed through the game machine body 200 while manipulating the card on the pad 300. On the other hand, in the example illustrated in FIG. 3, two users participate in the game executed through the game machine body 200 while manipulating the cards using their own pads 300-1 and 300-2, respectively. In other words, FIG. 3 illustrates a usage form in which the pad 300 is provided to each participant in the game. The respective pad s300-1 and 300-2 are connected with the game machine body 200 via wireless communication such as Bluetooth (a registered trademark) (the same as above).

Further, although not illustrated, the pad 300 connected to the game machine body 200 may be provided in accordance with the number of players participating in the game. Alternatively, a usage form in which a plurality of players shares one pad 300 and play the game without providing the pad 300 regardless of the number of players participating in the game.

The player can perform a manipulation in the game by moving the card and changing a direction of the card on the pad 300. Further, in a case in which the player places the card 400 on the pad 300, an interaction is executed, for example, a video or a music corresponding to information read from the card 400 (or an arbitrary video or music irrelevant to information recorded in the card 400) is reproduced through the game machine body 200. It is possible to further enjoy a game of a smartphone or a tablet. Further, information such as an experience value obtained by the player playing the game (including information such as a score, a game level, acquired spoils, exhaustion of a weapon, or the growth or evolution of a corresponding character in the game) is recorded in the card 400 through the pad 300. The player can enjoy the game while taking over the past history (a war record or the like in the game) by using his/her own card 400 continuously.

FIGS. 4 to 8 illustrate manipulation examples for the card 400 on the pad 300. The user who is the player of the game can perform a manipulation on the card 400 such as a manipulation of placing the card 400 on the pad 300 (see FIG. 4), a manipulation of removing the card 400 from the pad 300 (see FIG. 5), a manipulation of changing the position of the card 400 on the pad 300 (see FIG. 6), a manipulation of moving the card 400 on the pad 300 back and forth or right and left (see FIG. 7), a manipulation of change (or rotating) the card 400 on the pad 300 from a vertical placement to a horizontal placement (see FIG. 8), a manipulation of turning the card 400 on the pad 300 upside down (not illustrated).

On the game machine body 200 side, it is possible to implement an interaction based on a video or an audio of the game corresponding to the card 400 by controlling an output of a video or an audio on the screen 201 on the basis of the information read from the RFID tag in the card 400 placed on the pad 300. For example, the game machine body 200 side causes a video of a character corresponding to a design drawn on the surface of the card 400 to appear on the screen 201 (see FIG. 9).

Further, the game machine body 200 can implement the interaction based on the video or the audio of the game in response to the user manipulation on the card 400 on the pad 300 such as a manipulation of removing the card 400 from the pad 300, a manipulation of changing the position of the card 400, a manipulation of moving the card 400 back and forth or left and right, a manipulation of turns the card 400 sideways, or a manipulation of turning the card 400 upside down (see FIGS. 4 to 8). For example, the game machine body 200 controls the output of the video or the audio, for example, such that the screen or the progress of the game is switched in accordance with a type of the card 400 placed on the pad 300 by the user, a position or direction of the card 400 placed on the pad 300, and a motion of the card 400 on the pad 300.

Further, the game machine body 200 can record information such as a status of the character (the growth or evolution degree, an emotion, a fatigue degree, or the like) or a score of the game in the RFID tag in the card 400 via the pad 300 with the progress of the game. Therefore, the player can enjoy the game while taking over the past history (a war record or the like in the game) by continuously using his/her own card 400.

C. Exchange of Card

If the player continues to use the same card for a long period of time, the character grows or evolves in accordance with the progress of the game, and the data recorded on the card is sequentially updated accordingly. On the other hand, the design of the character printed on the surface of the card does not change. For this reason, there is a problem in that a gap between the physical appearance of the card and content is large. The gap further increases with the passage of time or the progress of the game.

A technique of drawing the design on the surface of the card using electric paper instead of the face surface printing is also considered (for example, see Patent Literature 3). However, it is difficult to say that a printing quality of the electric paper is sufficient when this application is filed, and it is considered to be difficult to draw a design having a quality desired by the user (player).

Further, even in a case in which a figure with an internal RFID tag is used in a game instead of the card, the problem of the gap between the physical appearance and the content may occur as well. In a case in which a heterologous object such as a figure is used, it is much more difficult to apply the electric paper.

In this regard, a method of solving the problem of the gap by upgrading an object such as the card or the figure in which the gap between the physical appearance such as a design on the surface, a shape, or a size and data recorded therein is large with a new card or a new figure having a suitable design, shape, or size is considered.

For example, cards which the player can currently acquire may be introduced on a web site of a game publisher or a game machine body manufacturer/distributor.

The player can access the web site using the game machine body including a smartphone, a tablet, or the like, or other information terminals and select a card which the player desires to acquire.

The upgrade to the new card basically assumes a business form of purchasing a card. Further, each player may be allowed to purchase an arbitrary card freely but may be given an authority to purchase a new card in association with a currently used card. For example, one or more types of cards to which the card can be upgraded may be decided in accordance with information recorded on a currently owned card (for example, the status of the character such as the growth or evolution degree, an emotion, or a fatigue degree of the character), a score or spoils acquired in the game, or the like, and an authority to purchase the cards may be given. Further, it is possible to motivate the player to enjoy the game if the player who acquired a higher score is permitted to upgrade to a card having a higher grade.

Further, in addition to a mechanism of giving an authority to purchase one new card for one card, a mechanism of giving an authority to purchase one new card for a combination of two or more cards, a mechanism of simultaneously giving an authority to purchase a plurality of new cards for a combination of a plurality of cards, or the like may be employed.

It is possible to solve the problem of the gap between the design (the physical appearance) drawn on the surface of the card and the information recorded in the card through the method in which the player upgrades to the new card. On the other hand, there is also a security problem in that a fake card traded at a low price through a spoofing web site or the like should be prevented from being used in the game.

FIG. 10 illustrates a rough procedure until the player purchases a new card and starts using the new card since starting using a card.

A card which is initially owned by the player may be included in a package of the game machine body or game software. Alternatively, a game or application publisher or a game machine body manufacturer/distributor may give an authority to purchase one or more types of cards which can be initially owned, and the player may purchase it through the web site or the like.

The player fosters the character corresponding to the card through the game. Information related to the growth degree of the character or the like is sequentially recorded in the currently used card. For example, the player makes a decision to upgrade to a new card, that is, purchase a card if the player feels the gap between the character growing or evolving in the game and the design drawn on the surface of the currently used card (hereinafter also referred to as an "old card" for the sake of convenience in order to distinguish it from the new card).

Alternatively, if a certain degree or more of gap is detected between the current status of the character read from the card placed on the pad and the design on the card surface determined on the basis of card identification information or the like, the game machine body side may give a notification indicating that it is possible to upgrade to the new card to the player. At this time, the game machine body may access a game/application server or the like, transmits the information read from the card placed on the pad, and inquires about whether or not it is possible to upgrade the card.

For example, a screen illustrated in FIG. 11 is displayed on the game machine body to give a notification indicating that it is possible to upgrade to the new card to the player. For example, a purchase order button 1101 is placed at the lower right of the notification screen, and when the player touches the button 1101, a procedure to upgrade to the new card, that is, purchase the new card starts.

The game machine body accesses a predetermined web site and activates a process for a new card purchase procedure. In the card purchase procedure, the game machine body accesses a card management server (a tentative name).

The card management server is run by, for example, the game publisher, the game machine body manufacturer/distributor, or the like and manages information related to the cards of all the players. Further, the card management server provides a web site in which purchasable cards are introduced to the player, or the card purchase procedure is performed and acquires information necessary for managing the cards from the web site.

Further, as illustrated in FIG. 12, the game machine body displays a list of cards to which the player can upgrade currently. In an embodiment, the card management server is assumed to perform a process related to the card upgrade. For example, the card management server may allocate an authority to purchase the card in accordance with the information recorded in the old card placed on the pad (for example, the status of the character such as the growth or evolution degree, an emotion, or a fatigue degree of the character), a score or spoils acquired in the game, or the like. Further, the card management server may allocate an authority to purchase the card in consideration of user information of the player.

In a case in which the game machine body receives information related to a card which can be upgraded from the card management server and displays a card list screen illustrated in FIG. 12. As indicated by reference numerals 1201 and 1202, the card list screen displays a list of thumbnails of designs of the surfaces of the respective cards. In FIG. 12, cards that can be upgraded are indicated as "A" and "B" for simplification of the drawing.

The player can select the card desired to be upgraded on the card list screen illustrated in FIG. 12. For example, if the player selects the card "A," transition to a screen illustrated in FIG. 13 is performed, and an authentication process for the old card to be exchanged with the new card "A" is performed. In the screen illustrated in FIG. 13, in order to read information necessary for the authentication process from the old card, the player is urged to place the old card on the pad, and a message such as "please hold it over here" indicated by reference numeral 1301 is displayed.

If the information recorded in the old card is read through the pad, the game machine body transfers the read information to the card management server. Further, the card management server executes the user authentication for the player and the authentication process for the old card using the information read from the old card. Further, in the authentication process for the old card, a message such as "authentication in progress . . . " indicated by reference numeral 1302 is displayed on the screen of the game machine body to explicitly indicate that the authentication process is being performed and implicitly suggest the player to keep the old card to be placed on the pad to the player.

Then, if the authentication process for the old card is successfully performed, the card management server gives the player the authority to purchase the new card "A" and gives a notification indicating an authentication result to the game machine body.

If a notification indicating that it is possible to upgrade to the card "A" selected by the player is received from the card management server, the game machine body displays a screen indicating that the authentication has been successfully completed as illustrated in FIG. 14. Further, if a notification indicating that the authentication process for the old card has failed is received from the card management server, the game machine body displays information indicating that it is unable to upgrade the card which fails in the authentication on the display although not illustrated.

Then, in a case in which the authentication process for the old card is successfully performed, the player can start the procedure of purchasing the card "A." The purchase procedure is supposed to be carried out online. The player can perform the new card purchase procedure using the same game machine body or can perform a card purchase order procedure on the web using an information terminal such as a smartphone or a tablet different from the game machine body or a personal computer.

The player can perform the new card purchase order procedure as the user having an account, a guest or a new user. The player can place a new card purchase order as the account user by inputting account information through an information terminal used for the new card purchase order. Further, in a case in which the player places the new card purchase order as the guest or the new user, the player inputs basic information such as a name, an address (a shipping addressee of the new card), a telephone number, an e-mail address, and the like through the information terminal. Further, even when the new card purchase order is placed as the account user, it is assumed to be able to have an opportunity to revise the basic information.

Further, even in the case of purchasing the new card as the account user, the guest, or the new user, the player selects a payment method and input necessary items through the same information terminal. As a payment method for card balance, a credit card, a prepaid card corresponding to Point of Sales Activation (POSA) or the like, convenience store payment, carrier billing, cash on delivery (COD), and the like are prepared. FIG. 15 illustrates a screen in which the credit card is selected as the payment method, and necessary items are input. In the lower right of the screen, a decision button is placed as indicated by reference numeral 1501, and the payment method is finally decided when this button is selected.

Accordingly, the player confirms the new card purchase order through the payment process for the new card. Then, a card purchase order completion e-mail is transmitted to at least one of the game machine body which has initiated the new card purchase order, the information terminal which has performed the payment procedure for purchasing the new card, or other information terminals carried by the player. FIG. 16 illustrates a screen of the card purchase order completion e-mail. In addition to a purchase reward (THANK YOU !!!), a confirmation number, contact information (an e-mail address or a telephone number), or the like is displayed on this screen.

Thereafter, the card purchased by the player is shipped from the game publisher or the game machine body manufacturer/distributor (or a contractor entrusted by them) and delivered to the hand of the player through a logistics service.

Here, the new card is assumed to be shipped in an inactive state. Since the card in the inactive state is unable to work, it is necessary to activate it. Further, the card is unable to be activated unless the authentication process performed by the card management server is completed. Therefore, although the card is stolen or leaks out by an illegal ways during the delivery or before it reaches a hand of a legitimate player, since the authentication and the activation of the card are unable to be performed, a person who illegally acquires the card is unable to enjoy the game using the card illegally.

Further, if the player acquires the purchased new card, it is necessary to activate the card in the inactive state before using it. The activation is a process that causes the card to be usable by the player.

The player places the received new card on the pad. Then, the game machine body accesses the card management server. The card management server reads information of the new card placed on the pad through the game machine body and executes the user authentication for the player and the authentication process for the new card. Further, in order to more strictly implement the user authentication process and the authentication process for the new card, not only the new card but also the old card is placed on the pad at the same time, and the card management server performs the authentication process with reference to the information recorded in the old card as well. Here, a card manipulation procedure for the authentication process for the new card will be described in detail later.

Then, if the authentication process for the new card is successfully performed, the card management server implements the activation process for the new card. The card activation process is implemented, for example, by writing predetermined activation information in the card.

Further, in a case in which the new card and the old cards are not permitted to be used at the same time, the card management server may perform an initialization or invalidation process for the old card placed on the pad immediately after executing the activation process for the new card through the game machine body. The old card which has undergone the initialization or invalidation process enters the inactive state. The card initialization or invalidation process is implemented, for example, by rewriting activation information recorded in the card to an initial state or writing invalidation information. Here, in a case in which it is desired to continuously play with the old card, the card initialization or invalidation process is unnecessary.

Thereafter, the player can use the new card in the game instead of the old card. Alternatively, the player can arrange the new card and the old card side by side and play.

FIG. 17 schematically illustrates a functional configuration of a communication system 1700 in which a card management server 500 is added to the game system 100 including the game machine body 200, the pad 300, and the card 400. For example, the server 500 is installed on a wide area network such as the Internet. The game machine body 200 is connected to an external network via Wi-Fi or an Ethernet (a registered trademark) cable and can communicate with the server 500. Hereinafter, functional configurations of the respective devices constituting the communication system 1700 will be described in detail below.

The game machine body 200 is configured as an information terminal such as, for example, a smartphone or a tablet and includes a control unit 211, a display unit 212, an audio output unit 213, an input unit 214, a network connecting unit 215, and a connection control unit 216.

The control unit 211 executes a game or an application and controls an overall operation of each unit in the game machine body 200. For example, the game or application can be downloaded from a predetermined site on the Internet through the network connecting unit 215. Alternatively, the game machine body 200 may be equipped with a slot (not illustrated) into which a game/application cartridge is loaded, and the game or the application read from the cartridge loaded into the slot is executed by the control unit 211.

The display unit 212 includes the screen 201 (described above), and displays and outputs a processing result obtained by the control unit 211 such as a game video. Further, the audio output unit 213 outputs a processing result obtained by the control unit 211 such as a game audio or a game video. Further, although not illustrated, the game machine body 200 may further be equipped with an output device using haptics.

The input unit 214 includes, for example, a touch panel superimposed on the surface of the screen 201, and the user who is the game player can perform an input manipulation such as a game command through the touch panel. Further, the input unit 214 may include a speaker or the like and be able to receive a voice command from the user. The game machine body 200 may also be equipped with a joystick or a game controller as the input unit 214.

The network connecting unit 215 complies with a wireless or wired LAN (Local Area Network) standard such as Wi-Fi or Ethernet (a registered trademark) and can be connected to a LAN installed in a place in which the game machine body 200 is installed (in a house or the like) and connected to a wide area network such as the Internet via the LAN.

The connection control unit 216 is connected with the pad 300 using wireless communication such as Bluetooth (a registered trademark) or a cable such as a USB, and exchanges information with the pad 300. For example, the connection control unit 216 receives the information read from the card 400 placed on the pad 300 from the pad 300 and transmits information to be recorded in the card 400 to the pad 300.

The pad 300 includes a control unit 301, a reader/writer unit 302, a card detecting unit 303, and a connection control unit 304.

As can be seen from FIG. 1, the pad 300 has a plate-like housing structure, and a housing is installed on a floor or a desk so that a manipulation plane on which the user performs a manipulation of placing the card 400 or moving the card 400 faces upwards and provided for use.

The reader/writer unit 302 includes a plurality of antenna coils (not illustrated in FIG. 17) arranged in a two-dimensional array form in an in-plane direction and can perform reading of information from the RFID tag in the card 400 placed at an arbitrary position on the manipulation plane and writing of information to the RFID tag using any one of the antenna coils selectively.

The card detecting unit 303 detects a position or a direction in which the card 400 is placed on the manipulation plane. For example, the card detecting unit 303 is configured such that N×M capacitance sensors are arranged in a two-dimensional array form in the in-plane direction of the manipulation plane. Basically, the capacitance sensor is a proximity sensor which uses a phenomenon that charges Q accumulated in an electrode change as an object approaches, and a capacitance C changes as a result. For example, the change in the capacitance C can be measured as an oscillation status of a CR oscillation circuit. If an object is placed on the manipulation plane of the pad 300, as a distance from the object is smaller, the capacitance of the capacitance sensor changes, and a higher detection value is output. Further, if a metallic object approaches, since the capacitance greatly changes, a higher detection value is output. On the other hand, when a non-metallic object such as paper or resin approaches, since the change in the capacitance is small, a low detection value is output.

As described above, the player performs the manipulation for the card 400 on the pad 300 such as the manipulation of removing the card 400 from the pad 300, the manipulation of changing the position of the card 400, the manipulation of moving the card 400 back and forth or right and left, the manipulation of turning the card 400 sideways, or the manipulation of turning the card 400 upside down (see FIGS. 4 to 8). The card detecting unit 303 detects the position or the direction in which the card 400 is placed on the basis of detection values of the respective capacitance sensors arranged in a two-dimensional array form. For the details of the configuration of the card detecting unit 303 and the process of detecting the position or the direction in which the card 400 is placed, for example, the specification of Japanese Patent Application No. 2017-63189 already assigned to the present applicant is referred to.

The connection control unit 304 is connected with the game machine body 200 using wireless communication such as Bluetooth (a registered trademark) or a cable such as a USB and exchanges information with the game machine body 200. For example, the connection control unit 304 transmits the information read from the card 400 placed on the pad 300 through the reader/writer unit 302 to the game machine body 200 or receives information to be recorded in the card 400 from the game machine body 200 and transmits the information to the reader/writer unit 302.

The control unit 301 centrally controls the operation of each unit in the pad 300. The control unit 301 controls the transmission and reception process of information with the game machine body 200 via the connection control unit 304. Further, the control unit 301 controls the reading and the writing of information with respect to the RFID tag in the card 400 via the reader/writer unit 302.

Further, the control unit 301 performs control of switching the antenna coil used for access to the card 400 placed on the manipulation plane on the basis of the detection result of the card detecting unit 303.

Further, the control unit 301 can detect the user manipulation for the card 400 on the manipulation plane such as the manipulation of removing the card 400 from the pad 300, the manipulation of changing the position of the card 400, the manipulation of moving the card 400 back and forth or left and right, the manipulation of turning the card 400 sideways, or the manipulation of turning the card 400 upside down on the basis of the detection result of the card detecting unit 303, and gives a notification indicating the detection result of the card manipulation performed by the player to the game machine body 200 via the connection control unit 304.

FIG. 19 schematically illustrates a cross-sectional structure of the pad 300. Here, the housing of the pad 300 and the circuit board are not illustrated in FIG. 19. Basically, the housing of the pad 300 is installed on the floor or the desk so that the manipulation plane on which the user performs the manipulation of placing the card 400 or moving the card 400 faces upward and provided for use. The card detecting unit 303 is disposed on the manipulation plane side. Further, the reader/writer unit 302 includes a plurality of antenna coils arranged in a two-dimensional array form in the in-plane direction but disposed on the bottom side opposite to the manipulation plane.

Further, in FIG. 19, the pad 300 has a configuration in which the card detecting unit 303 and the reader/writer unit 302 are arranged in order from the upper side (that is, the manipulation plane side), but a configuration in which the card detecting unit 303 and the reader/writer unit 302 are arranged in the opposite order in accordance with detection sensitivity or the like necessary for each of the card detecting unit 303 and the reader/writer unit 302, a configuration in which the capacitance sensor is disposed in the antenna coil of the reader/writer unit 302, and a card detection function and a reader/writer function are multiplexed in one layer, or the like is also considered.

The card 400 is a so-called "IC card" in which an RFID tag 401 is embedded in a non-metal sheet such as paper or resin. The RFID tag 401 includes a communication function module capable of performing proximity wireless communication with the reader/writer unit 302 of the pad 300 in accordance with a predetermined standard and a storage function (memory) module in which the reader/writer unit 302 is able to read or write information using the proximity wireless communication. As described above, a design indicating a character, weapon, spoils, or the like of a game is drawn on one side or both sides of the card 400 through the card face printing. Further, an antenna coil for proximity wireless communication (not illustrated in FIG. 17) is formed in the card 400 using techniques such as printing and etching.

The card management server 500 is a server that manages information related to the user who is the game player and the card 400 purchased by each user (or distributed to each the user). The card management server 500 may be physically constituted by a single server device or may be constituted by a plurality of server devices. For example, the card management server 500 is run by the publisher (or a contractor entrusted by the publisher) of the game or the application executed through the game machine body 200 or the card 400. For example, the card management server 500 is installed on a wide area network such as the Internet. The game machine body 200 is connected to an external network via a Wi-Fi or an Ethernet cable and can communicate with the card management server 500.

In the example illustrated in FIG. 17, the card management server 500 includes a user authenticating unit 501, a product registering unit 502, a payment processing unit 503, a transaction managing unit 504, a card authenticating unit 505, a card writing unit 506, a communication processing unit 507, and the like as server functions.

The communication processing unit 507 performs a data transmission and reception process with an external device via a network such as the Internet. Here, the external device may be the game machine body 200 or the pad 300 connected to the card management server 500 via the game machine body 200. The communication processing unit 507 performs transmission and reception of data necessary for carrying out various kinds of processes on the card 400 used (by player) on the game machine body 200 side using the functions of the respective units 501 to 506 to be described later.

The user authenticating unit 501 performs the authentication process for the user which is also the user of the game machine body 200 and the player of game. The authentication process may use the authentication information read from the card 400 placed on the pad 300 by the user.

The product registering unit 502 performs registration of products to be sold to the user such as a game or an application downloaded to the game machine body 200 and the card 400 used in the game or the application, and management after the sale, and the like.

The payment processing unit 503 performs a payment process such as payment of an amount of money associated with the sale of the product such as downloading of a game or an application, the sale of the card 400, or the like for the user who is the game player. The payment processing unit 503 supports a payment method such as, for example, a credit card, a prepaid card corresponding to POSA or the like, convenience store payment, carrier billing, or cash on delivery (COD).

The transaction managing unit 504 centrally manages information related to transactions executed with the user such as downloading of a game or an application to the game machine body 200 or distribution of the card 400 used in a downloaded game or application.

In an embodiment, the transaction managing unit 504 controls the respective units of the card management server 500 in order to implement the processing necessary when the player purchases the new card or when the player exchanges the old card with the new card. For example, for a player who has placed a new card purchase order, cards which can be purchased or upgraded are selected among the cards registered in the product registering unit 502, and a notification indicating the selected cards is given to the game machine body 200 of the player.

Further, the transaction managing unit 504 instructs the payment processing unit 503 to perform the payment process related to the card which the player decides to purchase. Further, the transaction managing unit 504 monitors shipping and delivery statuses in real time after the payment process is confirmed.

Further, the transaction managing unit 504 manages identification information and a current status of each card which has been sold or distributed to each player so far. For example, when the new card arrives at the player's hand, the transaction managing unit 504 performs confirmation of a predetermined condition on each of the old card and the new card, and if the confirmation is successfully performed, the transaction managing unit 504 performs the activation process for the new card and moves the data recorded in the old card to the new card so that the player can use the new card.

Further, the transaction managing unit 504 also manages a processing method for each card which is exchanged with new card (that is, when it becomes the old card). For example, for cards which are not permitted to be simultaneously used with other cards, the invalidation or initialization process is designated as the processing method for the old card. The transaction managing unit 504 executes the invalidation or initialization process for the old card together with the activation process for the new card through the game machine body 200 of the player.

The card authenticating unit 505 conducts the authentication process for the card 400 through the game machine body 200 on the basis of the information read from the card 400 placed on the pad 300. The authentication process of the card 400 includes the authenticity of the card 400 to be used and verification of the authenticity of the user who uses the card 400.

The card writing unit 506 performs a process of writing information in the card 400 placed on the pad 300 via the game machine body 200 and the pad 300. In addition to the normal data writing process, the activation process for the card 400 in the inactive state or the initial state (shipped) and the initialization or invalidation process for the card 400 in the active state are included in the writing process for the card 400.

For example, short-range wireless communication is performed between the reader/writer unit 302 in the pad 300 and the RFID tag 401 in the card 400 in accordance with the proximity wireless communication standard such as near field communication (NFC) developed by Sony and Philips. FIG. 18 illustrates a functional configuration for performing the proximity wireless communication between the reader/writer unit 302 in the pad 300 and the RFID tag 401 in the card 400. Antenna resonance circuits 1802 and 1812 installed in the reader/writer unit 302 and the card 400, respectively, are electromagnetically coupled to each other, so that an information signal is exchanged. Specifically, the RFID tag 401 modulates a non-modulated carrier wave transmitted from the reader/writer unit 302 and transmits the modulated carrier wave, and the reader/writer unit 302 can read the information recorded in the RFID tag 402 by demodulating the modulated carrier wave.

The antenna resonance circuit 1802 of the reader/writer unit 302 includes a resistor $R_1$, a capacitor $C_1$, and a coil $L_1$, and transmits an information signal generated by a processing unit 1801 to the RFID tag 401 side. Further, the antenna resonance circuit 1802 receives the information signal from the RFID tag 401 and supplies the information signal to the processing unit 1801. Further, a resonance frequency specific to the antenna resonance circuit 1802 is set to a predetermined value in advance in accordance with the capacitance of the capacitor $C_1$ and the inductance of the coil $L_1$.

On the other hand, the antenna resonance circuit 1812 of the RFID tag 401 includes a resistor $R_2$, a capacitor $C_2$, and a coil $L_2$, and transmits an information signal which is generated by a processing unit 1811 and modulated by a load switching modulation circuit unit 1813 to the antenna (the coil $L_1$) of the reader/writer unit 302 side. Further, the antenna resonance circuit 1812 receives the information signal from the reader/writer unit 302 side and supplies the information signal to the processing unit 1811. Further, the resonance frequency of the antenna resonance circuit 1812 is set to a predetermined value in advance in accordance with the capacitance of the capacitor $C_2$ and the inductance of the coil $L_2$.

The processing unit 1811 on the RFID tag 401 side has a memory (not illustrated) that stores a data sequence or the like. The processing unit 1801 on the reader/writer unit 302 side performs accesses such as reading or writing of data on the memory in the processing unit 1811 through the proximity wireless communication. It is possible to perform a data transmission operation through a predetermined authentication process specified in NFC between the reader/writer unit 302 and the RFID tag 401.

Further, in the proximity wireless communication such as NFC, since a communication function or information is protected in a circuit chip having temper resistance, and communication is performed at a short distance, it is difficult to intercept, and thus there is a feature in that illegal access and data falsification are prevented, and thus a secure communication is possible. The proximity wireless communication technology has already been widely used for payment in shops, automatic ticket gates at stations, entering/leaving management and locking of buildings, an authentication technique, and the like.

FIGS. 20 and 21 illustrate an example of a communication sequence implemented by the communication system 1700 when the player starts using the starts using the new card. Since the new card is shipped and delivered in the inactive state as described above, in order for player to start using the new card, it is necessary to perform the activation process.

If the new card which is ordered to be purchased at the hand, the player instructs the game machine body 200 to start using the new card. In response to the instruction input from the player, the game machine body 200 requests the card management server 500 to perform the process of starting using the new card (S2001).

In order to more strictly perform the user authentication process for the player and the authentication process for the new card, the card management server 500 transmits a request to present the old card (that is, the card which the player has used so far) to the game machine body 200 (S2002).

Upon receiving the request to present the old card from the card management server 500, the game machine body 200 executes screen display for urging the player to present the old card, that is, to place the old card on the pad 300 (S2003). Further, in process S2003, a notification based on a sound or a notification based on vibration may be given to the game machine body 200 in place of the screen display (or in conjunction with the screen display). Alternatively, a notification may be given using an information terminal other than the game machine body 200 owned by the player. Further, the game machine body 200 instructs the pad 300 to search for the card placed on the pad 300 (S2004).

Here, it is assumed that the player places the old card on the pad 300 in accordance with the instruction displayed on the screen of the game machine body 200 (S2005). If the pad 300 detects that the old card is placed on the pad 300 in response to the card search instruction from the game machine body 200, the pad 300 notifies the card management server 500 of the card detection result via the game machine body 200 (S2006).

Subsequently, the card management server 500 transmits a request to authenticate the old card placed on the pad 300 to the pad 300 via the game machine body 200 (S 2007). Further, if authentication data read from the old card through the pad 300 is received via the game machine body 200 (S2008), the card management server 500 checks the authenticity of the old card using the function of the card authenticating unit 505 (S2009). The card authenticity confirmation procedure is carried out in accordance with the proximity wireless communication standard such as NFC, but here, the old card placed on the pad 300 is assumed to be authentic, and detailed description of the authenticity confirmation procedure is omitted.

Then, the card management server 500 transmits a request to read the data recorded in the old card placed on the pad 300 (S2010). Further, if the data recorded in the old card is read by the pad 300 and received via the game machine body 200 (S2011), the card management server 500 checks whether or not it is the old card which the player of the request source has acquired legally previous using the function of the transaction managing unit 504 on the basis of card identification information received in the received data (S2012).

Further, the card management server 500 performs confirmation of a predetermined condition on the old card on the basis of the data read from the old card on the pad 300 using the function of the transaction managing unit 504 mainly (S2013).

Specifically, the card management server 500 confirms the current status of the old card. For example, the card management server 500 confirms whether or not the information value such as the status of the character (the growth or evolution degree, an emotion, a fatigue degree, or the like) recorded in the old card or the score of the game exceeds a predetermined level value, and requirements for upgrading to the new card are actually satisfied. Further, the card management server 500 searches for the new card which is an exchange counterpart of the old card. Further, the card management server 500 confirms the payment status regarding the purchase of the searched new card. In a case in which the card of the exchange counterpart is unable to be found or in a case in which the payment process for the card which is the exchange counterpart is not completed, it is dealt as a failure in a predetermined condition. Further, the predetermined condition related to the old card to be confirmed in process S2013 is assumed to be managed by, for example, the card management server 500 (the transaction managing unit 504 or the like) or an external server.

Then, in a case in which the authenticity and the verification of the card identification information of the old card and the confirmation of the predetermined condition of the old card are completed successfully, the card management server 500 then starts a process for the new card purchased by the player. First, the card management server 500 transmits a request to present the new card to the game machine body 200 (S2014). Further, on the game machine body 200 side, in order to perform the process of moving the information recorded in the old card to the new card, the old card is left placed on the pad 300.

Upon receiving the request to present the new card from the card management server 500, the game machine body 200 performs the screen display for urging the player to present the new card, that is, place the new card on the pad 300 (S2015). Further, in process S2015, a notification based on a sound or a notification based on vibration may be given to the game machine body 200 in place of the screen display (or in conjunction with the screen display). Alternatively, a notification may be given using an information terminal other than the game machine body 200 owned by the player. Further, the game machine body 200 instructs the pad 300 to search for the card placed on the pad 300 (S2016).

Here, it is assumed that the player places the new card on the pad 300 in accordance with the instruction displayed on the screen of the game machine body 200 (S2017). If the pad 300 detects that the new card is placed on the pad 300 in response to the card search instruction from the game machine body 200, the pad 300 notifies the card management server 500 of the card detection result via the game machine body 200 (S2018).

Then, the card management server 500 transmits a request to authenticate the new card placed on the pad 300 (S2019). Further, if authentication data read from the new card through the pad 300 is received via the game machine body 200 (S2020), the card management server 500 checks the authenticity of the new card using the function of the card authenticating unit 505 (S2021). The card authenticity confirmation procedure is carried out in accordance with the proximity wireless communication standard such as NFC, but here, the new card placed on the pad 300 is assumed to be authentic, and detailed description of the authenticity confirmation procedure is omitted.

Next, the card management server 500 transmits a request to read the data recorded in the new card placed on the pad 300 (S2022). Further, if the data recorded in the new card is read by the pad 300 and received via the game machine body 200 (S2023), the card management server 500 checks whether or not it is the new card which the player of the request source has acquired legally previous using the function of the transaction managing unit 504 on the basis of card identification information received in the received data (S2024).

Further, the card management server 500 performs confirmation of a predetermined condition on the new card on the basis of the data read from the new card on the pad 300 using the function of the transaction managing unit 504 mainly (S2025).

Specifically, the card management server 500 confirms that the new card is in the inactive state. Further, the card management server 500 confirms whether or not the new card is a card which is an exchange counterpart of the old card (the exchange counterpart of the old card is searched for on the basis of the information read from the old card in process S2013 described above). Further, the card management server 500 searches for a process to be performed on the old card (invalidation or initialization of the old card, or the like). Further, the predetermined condition related to the old card to be confirmed in process S2025 is assumed to be managed by, for example, the card management server 500 (the transaction managing unit 504 or the like) or an external server.

Then, in a case in which the authenticity and the verification of the card identification information of the new card and the confirmation of the predetermined condition of the new card are completed successfully, the card management server 500 then transmits a final confirmation of the process start for the new card and the old card to the game machine body 200 (S2026). If the final confirmation of the process start is received from the card management server 500, the game machine body 200 executes the screen display for notifying the player of the process start (S2027), and displays information indicating that the screen display is performed to the card management server 500 (S2028). The screen may include display for warning the player not to remove the old card and the new card from the pad 300. Further, in process S2027, a notification based on a sound or a notification based on vibration may be given to the game machine body 200 in place of the screen display (or in conjunction with the screen display). Alternatively, a notification may be given using an information terminal other than the game machine body 200 owned by the player.

Then, the card management server 500 gives an instruction to execute a process on the new card and the old card placed on the pad 300 via the game machine body 200 (S2029).

Specifically, the card management server 500 requests the pad 300 to perform the activation process for the new card and transfer of the data from the old card to the new card via the game machine body 200. Further, the card management server 500 performs a request to perform a process (for example, invalidation or initialization) for the old card searched in processing 2025. Since the old card is invalidated or initialized, the new card and the old card are unable to be used in the game at the same time. If the requested process ends on the pad 300 side, a completion notification is transmitted to the card management server 500 (S2030).

Then, if the processing result for the new card and the old card is confirmed (S2031), the card management server 500 notifies the game machine body 200 of the completion of the process (S2032). In response to this, the game machine body 200 displays a screen for giving a notification indicating that the new card can be used to the player (S2033). In this screen, it is possible to display that the old card is unable to be used together. Further, in process S2033, a notification based on a sound or a notification based on vibration may be given to the game machine body 200 in place of the screen display (or in conjunction with the screen display). Alternatively, a notification may be given using an information terminal other than the game machine body 200 owned by the player.

Since the design of the surface of the card is drawn through the card face printing or the like, although the gap with the information recorded on the card is large, it is difficult to change the design. On the other hand, according to an embodiment, the player can exchange with a new card having a design suitable for the information recorded on the card, it is possible to continuously enjoy the game. The player can use the service of exchanging with a card corresponding to a level of a character or the like fostered in the game (that is, exchanging an unnecessary card with a desired card), and the game or application publisher or the game machine body manufacturer/distributor can provide the card exchange service for a fee.

INDUSTRIAL APPLICABILITY

The techniques disclosed in this specification have been described in detail with reference to specific embodiments. However, it would be understood that those skilled in the art can make modifications or substitutions of the embodiments without departing from the gist of the technology disclosed in this specification.

In this specification, the description has been made centering on embodiments in which the technology disclosed in this specification is applied to the pad connected to the game machine body (or an information terminal such as a smartphone or a tablet that executes a game or an application), but the gist of the technology disclosed in this specification is not limited to thereto. The technology disclosed in this specification can be similarly applied to a pad connected to an information terminal that implements the purposes other than the game or a pad that reads a card used for the purposes other than the game.

Further, in this specification, the description has been made centering on embodiments related to the game system using the card, but the technique disclosed in this specification can be similarly applied to a game system using a figure or other objects.

In short, the technology disclosed in this specification has been described by way of example, and the description content of this specification should not be interpreted limitedly. In order to determine the gist of the technology disclosed in this specification, the scope of claims set forth below should be taken into consideration.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An information processing apparatus including:
circuitry configured to:
acquire first authentication data from a first object and second authentication data from a second object;
determine authenticity of the first object based on the first authentication data;
determine authenticity of the second object based on the second authentication data; and
change activation states of both the first object and the second object based on the determined authenticities of both the first object and the second object,
wherein, when the determined authenticities of both the first object and the second object are determined to be authentic, the circuitry is further configured to change the activation states of both the first object and the second object.

(2) The information processing apparatus according to (1), wherein the activation state of the first object and the activation state of the second object are different at a time the authentication data is acquired.

(3) The information processing apparatus according to (1) or (2), wherein, when the determined authenticities of both the first object and the second object are determined to be authentic, the circuitry is further configured to:
transfer data between the second object and the first object.

(4) The information processing apparatus according to any of (1) to (3), wherein the circuitry is further configured to:
receive data from the first object and the second object, the data including identification information; and
determine whether the first object and the second object have been acquired legally based on the identification information.

(5) The information processing apparatus according to any of (1) to (4), wherein the first object and the second object are figures.

(6) The information processing apparatus according to any of (1) to (5), wherein the first object and the second object are cards.

(7) The information processing apparatus according to any of (1) to (6), wherein a physical appearance of the first object is different than a physical appearance of the second object.

(8) The information processing apparatus according to any of (1) to (7), wherein the activation state of the first object is an inactive state and the activation state of the second object is an active state at a time the authentication data is acquired.

(9) The information processing apparatus according to any of (1) to (8), wherein, when the determined authenticities of both the first object and the second object are determined to be authentic, the circuitry is further configured to:
change the activation state of the first object to the active state and the activation state of the second object to the inactive state.

(10) The information processing apparatus according to any of (1) to (9), wherein, when the determined authenticities of both the first object and the second object are determined to be authentic, the circuitry is further configured to:
transfer data from the second object to the first object.

(11) The information processing apparatus according to any of (1) to (10), wherein the circuitry is further configured to:
confirm whether an information value recorded in the second object exceeds a predetermined level value; and
search for the first object which is an exchange counterpart of the second object.

(12) The information processing apparatus according to any of (1) to (11), wherein the circuitry is further configured to:
confirm that the first object is in an inactive state; and
confirm whether the first object is an exchange counterpart of the second object.

(13) An information processing method including:
acquiring first authentication data from a first object and second authentication data from a second object;
determining authenticity of the first object based on the first authentication data;
determining authenticity of the second object based on the second authentication data;
changing activation states of both the first object and the second object based on the determined authenticities of both the first object and the second object; and
changing, when the determined authenticities of both the first object and the second object are determined to be authentic, the activation states of both the first object and the second object.

(14) An information processing system including:
a communication device configured to read information from a first object and a second object and record information to the first object and the second object;
a game machine body configured to receive the information read from the first object and the second object and transmit the recorded information to the first object and the second object; and
an information processing apparatus including:
circuitry configured to:
acquire first authentication data from the first object and second authentication data from the second object;
determine authenticity of the first object based on the first authentication data;
determine authenticity of the second object based on the second authentication data; and change activation states of both the first object and the second object based on the determined authenticities of both the first object and the second object,
wherein, when the determined authenticities of both the first object and the second object are determined to be authentic, the circuitry is further configured to change the activation states of both the first object and the second object.

(15) The information processing system according to (14), wherein the communication device is a pad that communicatively interacts with the first object and the second object.

(16) An information processing device, including:
a receiving unit configured to receive first information read from a first object and second information read from a second object from an external device via a network;
a managing unit configured to manage a predetermined condition related to at least one of the first object and the second object;
a comparing unit configured to compare at least one of the first information and the second information with the predetermined condition; and
a transmitting unit configured to transmit a first request for the first object or a second request for the second object to the external device in accordance with a result of the comparison.

(17) The information processing device according to (16), in which the receiving unit receives the first information read from the first object and the second information read from the second object through a reader/writer connected to the external device in a wired or wireless manner via proximity wireless communication.

(18) The information processing device according to any of (16) to (17), in which the comparing unit compares authentication information of the first object serving as the first information or authentication information of the second object serving as the second information with the predetermined condition.

(19) The information processing device according to any of (16) to (18), in which the comparing unit compares identification information of the first object serving as the first information or identification information of the second object serving as the second information with the predetermined condition.

(20) The information processing device according to any of (16) to (19), in which the comparing unit compares a status of the first object serving as the first information or a status of the second object serving as the second information with the predetermined condition.

(21) The information processing device according to any of (16) to (20), in which the first and second objects are objects which are used in a game and able to record information related to the game, and the second object is an object serving as an exchange counterpart of the first object.

(22) The information processing device according to (21), in which the comparing unit compares an information value related to the game read from the first object serving as the first information, with a level value set as the predetermined condition.

(23) The information processing device according to any of (16) to (22), in which the transmitting unit transmits the second request to activate the second object to the external device in accordance with the comparison result.

(24) The information processing device according to any of (16) to (23), in which the transmitting unit transmits the first request to invalidate or initialize the first object to the external device in accordance with the comparison result.

(25) The information processing device according to (23), in which the transmitting unit transmits, in response to completion of an activation process for the second object, a third request to give a notification indicating the completion to a user to the external device or another device.

(26) An information processing method, including:
receiving first information read from a first object and second information read from a second object from an external device via a network;
managing a predetermined condition related to at least one of the first object and the second object;
comparing at least one of the first information and the second information with the predetermined condition; and
transmitting a first request for the first object or a second request for the second object to the external device in accordance with a result of the comparison.

(27) A computer program described in a computer readable format to cause a computer to function as:
an acquiring unit configured to acquire first information read from a first object and second information read from a second object, the first information and the second information being received from an external device via a network;
a managing unit configured to manage a predetermined condition related to at least one of the first object and the second object;
a comparing unit configured to compare at least one of the first information and the second information with the predetermined condition; and
an instructing unit configured to instruct a process of transmitting a first request for the first object or a second request for the second object to the external device in accordance with a result of the comparison.

REFERENCE SIGNS LIST

100 information processing system
200 game machine body (information terminal such as smartphone and tablet)
201 screen
211 control unit
212 display unit
213 audio output unit
214 input unit
215 network connecting unit
216 connection control unit
300 pad
301 control unit
302 reader/writer unit
303 card detecting unit
304 connection control unit
400 card
401 RFID tag
402 card body
500 card management server
501 user authenticating unit
502 product registering unit
503 payment processing unit
504 transaction managing unit
505 card authenticating unit
506 card writing unit
507 communication processing unit
1700 communication system
1801 processing unit 1802 antenna resonance circuit
1811 processing unit
1812 antenna resonance circuit
1813 load switching modulation circuit

The invention claimed is:

1. An information processing apparatus comprising:
circuitry configured to:
acquire first authentication data from a first object and second authentication data from a second object;
determine authenticity of the first object based on the first authentication data;
determine authenticity of the second object based on the second authentication data;
change activation states of both the first object and the second object based on the determined authenticities of both the first object and the second object being authentic;
determine whether or not to change the activation states of both the first object and the second object based on the activation state of the first object at a time the first authentication data and the second authentication data are acquired; and
determine to change the activation state of the first object to an active state and the activation state of the second object to an inactive state based on the activation state of the first object being in the inactive state at the time the first authentication data and the second authentication data are acquired and the activation state of the second object being in the active state at the time the first authentication data and the second authentication data are acquired.

2. The information processing apparatus according to claim 1, wherein the activation state of the first object and the activation state of the second object are different at the time the first authentication data and the second authentication data are acquired.

3. The information processing apparatus according to claim 1, wherein, when the determined authenticities of both the first object and the second object are determined to be authentic, the circuitry is further configured to:
transfer data between the second object and the first object.

4. The information processing apparatus according to claim 1, wherein the circuitry is further configured to:
receive data from the first object and the second object, the data including identification information; and
determine whether the first object and the second object have been acquired legally based on the identification information.

5. The information processing apparatus according to claim 1, wherein the first object and the second object are figures.

6. The information processing apparatus according to claim 1, wherein the first object and the second object are cards.

7. The information processing apparatus according to claim 1, wherein a physical appearance of the first object is different than a physical appearance of the second object.

8. The information processing apparatus according to claim 1, wherein, when the determined authenticities of both the first object and the second object are determined to be authentic, the circuitry is further configured to:
change the activation state of the first object to the active state and the activation state of the second object to the inactive state.

9. The information processing apparatus according to claim 1, wherein, when the determined authenticities of both the first object and the second object are determined to be authentic, the circuitry is further configured to:
transfer data from the second object to the first object.

10. The information processing apparatus according to claim 1, wherein the circuitry is further configured to:
confirm whether an information value recorded in the second object exceeds a predetermined level value; and
search for the first object which is an exchange counterpart of the second object.

11. The information processing apparatus according to claim 1, wherein the circuitry is further configured to:
confirm that the first object is in an inactive state; and
confirm whether the first object is an exchange counterpart of the second object.

12. The information processing apparatus according to claim 1, wherein the circuitry is further configured to:
determine to not change the activation states of both the first object and the second object based on the activation state of the first object being in an active state at the time the first authentication data and the second authentication data are acquired.

13. The information processing apparatus according to claim 1, wherein, the circuitry is further configured to:
transfer data from the second object to the first object based on the determination to change the activation states of both the first object and the second object.

14. An information processing method comprising:
acquiring first authentication data from a first object and second authentication data from a second object;
determining authenticity of the first object based on the first authentication data;
determining authenticity of the second object based on the second authentication data;
changing activation states of both the first object and the second object based on the determined authenticities of both the first object and the second object being authentic;
determining whether or not to change the activation states of both the first object and the second object based on the activation state of the first object at a time the first authentication data and the second authentication data are acquired; and
determining to change the activation state of the first object to an active state and the activation state of the second object to an inactive state based on the activation state of the first object being in the inactive state at the time the first authentication data and the second authentication data are acquired and the activation state of the second object being in the active state at the time the first authentication data and the second authentication data are acquired.

15. An information processing system comprising:
a communication device configured to read information from a first object and a second object and record information to the first object and the second object;
a game machine body configured to receive the information read from the first object and the second object and transmit the recorded information to the first object and the second object; and
an information processing apparatus comprising:
circuitry configured to:
acquire first authentication data from the first object and second authentication data from the second object;
determine authenticity of the first object based on the first authentication data;

determine authenticity of the second object based on the second authentication data;

change activation states of both the first object and the second object based on the determined authenticities of both the first object and the second object being authentic;

determine whether or not to change the activation states of both the first object and the second object based on the activation state of the first object at a time the first authentication data and the second authentication data are acquired; and determine to change the activation state of the first object to an active state and the activation state of the second object to an inactive state based on the activation state of the first object being in the inactive state at the time the first authentication data and the second authentication data are acquired and the activation state of the second object being in the active state at the time the first authentication data and the second authentication data are acquired.

16. The information processing system according to claim 15, wherein the communication device is a pad that communicatively interacts with the first object and the second object.

* * * * *